United States Patent Office 3,708,424
Patented Jan. 2, 1973

3,708,424
IONIC CONDUCTIVE SOLID ELECTROLYTE
Susumu Yoshimura and Reiji Sano, both of 1006 Oaza
Kadoma, Osaka, Japan
No Drawing. Filed Feb. 25, 1971, Ser. No. 118,988
Claims priority, application Japan, Mar. 4, 1970,
45/18,895
Int. Cl. H01g 9/02
U.S. Cl. 252—62.2        8 Claims

ABSTRACT OF THE DISCLOSURE

An ionically conductive organic solid material is provided, which is useful for an electrolyte for use in electric devices. The material is a crystalline electron donor-acceptor complex comprising an acceptor of 7,7,8,8-tetracyanoquinodimethane, and donors of monovalent cation interstitial and including multivalent cation impurities so as to possess the excellent ionic conductivity suitable for an electrolyte.

---

This invention relates to electrolytes and more particularly to organic ionic conductive solid electrolytes and the manufacture thereof.

There are known various types of ionic conductive solid materials one of which is an inorganic halide such as alkali metal halide, silver halide and alkali earth metal halide. None of these materials are utilized for an electrolyte for a capacitor etc., since all these materials have so low conductivities as to be virtually regarded as insulators at normal temperatures. Another type of the known ionic conductive materials is a ternary glass material such as Ag-I-Hg which has recently been developed. This new material has resistivities as low as about $100\Omega$ cm. Difficulty is, however, encountered in building up a high temperature and precisely controlling the ambient temperature when producing the ternary glass materials referred to above.

It is therefore an object of this invention to provide a novel ionic conductive solid electrolyte which is easily and economically manufactured.

Another object of this invention is to provide a novel ionic conductive solid electrolyte which has a sufficiently high ionic conductivity.

This invention employs the ionic conductivity of the electron donor-acceptor (EDA) complex including 7,7,8,8-tetracyanoquinodimethane (TCNQ) as an acceptor.

As is well known, the TCNQ molecule is a large and plain molecule which has such a great electron affinity that, when mixed or melted with another molecule, the TCNQ molecule takes an electron from and is united with the other molecule so as to produce an electron donor-acceptor crystalline complex as a whole. The crystals of the electron donor-acceptor complex may be either ionic or neutral depending upon the magnitude of the ionization potential of the opposite molecule. When the opposite molecule has a relatively small ionization potential, the TCNQ molecule captures the electron of the opposite molecule and ionically bonds with the opposite molecule.

Such EDA complexes as above-mentioned have thus far been regarded as electronically conductive materials. However, it is important that the EDA complexes have prominent ionic conductivities in addition to their electronic conductivities.

Examples of the molecules having small ionization potentials are those containing monovalent aromatic diamine, substituted ammonium ion, aromatic onium ion and metallic ion. The EDA complexes composed of the TCNQ and such a molecule above-exemplified have ionic conductivities of several percent of their total conductivities. It is, however, desired that highly ionic conductive EDA complexes be used for electrolytes.

According to this invention, an ionic conductive EDA complex is provided, which has an increased ionic conductivity.

The EDA complex of this invention is an organic ionic conductive material comprising ionic crystals composed of a TCNQ acceptor and a cationic donor component of a monovalent aromatic diamine, onium ion, substituted ammonium ion or metallic ion, and impurities of a multivalent cation. By addition of the multivalent cation as another donor to the EDA complex, the lattice of the EDA crystal is strained due to neutral condition with the result that lattice vacancies increase in the crystals. Since the magnitude of the ionic conductivity of a material depends upon the number of the lattice defects such as vacancies or holes, addition of multivalent cations to the EDA complex causes an increase in the ionic conductivity of the EDA complex.

Examples of preferred multivalent cations are alkaline earth metal, rare earth metal and transition earth metal ions. In particular, $Ba^{++}$, $Ca^{++}$, $Mg^{++}$, $Ce^{+++}$, $Sm^{+++}$, $Mn^{++}$, $Fe^{++}$, $Ni^{++}$ and $Co^{++}$ are preferable. Copper ion $Cu^{++}$ and aluminium ion $Al^{+++}$ can be also utilized.

The ionic conductivity of the EDA complex according to the invention is ascertained and measured by:

(1) Contacting a needle of electrode metal of aluminium or tantalum on a subject material in a crystal or pellet form and applying a positive potential to the needle relative to the subject material while observing the current through the needle, wherein if the ionic conductive phenomena occurs within the subject material, the current through the needle rapidly decreases due to anodic oxidation of the needle by the ionic conduction; or (2) Pressing a metal element or foil of aluminium, magnesium or calcium onto the subject material while observing the electromotive force between the metal and the subject material, wherein if a stable electromotive force is built up, then it is known that ionic conduction is present.

The following representative examples illustrate in some degree the scope of the invention. It will be seen that EDA complexes prepared according to the invention exhibit ionic conductivities which are several ten percent relative to the total conductivity. Such conductivities are greater than any of those achieved by the known art.

EXAMPLE I 50 gr. of ammonium-TCNQ ($NH_4^+TCNQ^-$) and 1 gr. of aluminium-TCNQ ($Al^{+++}(TCNQ)_3^-$) were refluxed in alcohol and thereafter recrystallized. The resistivity and the ionic conductivity of the resultant crystals were $5 \times 10^3 \Omega$ cm. and 5%, respectively, although the resistivity and ionic conductivity of the ammonium-TCNQ were $10^4 \Omega$ cm. and 1%, respectively.

EXAMPLE II

Triethyl ammonium-TCNQ (($C_2H_5)_3NH^+(TCNQ)^-$) having resistivity of $20\Omega$ cm. and substantially void of an ionic conductivity was used. The triethyl ammonium-TCNQ including 2% of copper-TCNQ $$(Cu^{++}(TCNQ)_2^-)$$

displayed a resistivity of $500\Omega$ cm. and an ionic conductivity of 1% providing desirable anodic oxidizability when used for aluminium.

EXAMPLE III

Potassium-TCNQ (K+(TCNQ)−) having a resistivity of $10^3 \Omega$ cm. was used. The potassium-TCNQ including 10% of magnesium was found to have a resistivity of $500 \Omega$ cm. and an ionic conductivity of 50%.

It is apparent that the electrolyte according to this invention is advantageous because it can be easily manufactured without use of a high temperature and precise control over the temperature. Furthermore, solidification of the electrolytes of an electric cell, electrolytic capacitor, electrolytic amplifier or the like is easily achieved by utilizing the electrolyte of this invention. The impurities of multivalent ions which can be utilized for electrolytes according to the invention are not limited to the ions used in the above examples but any multivalent cations can be used.

What is claimed is:

1. An electrolyte consisting essentially of a crystalline electron donor-acceptor complex of 7,7,8,8 - tetracyanoquinodimethane (TCNQ), with a monovalent cation selected from the group consisting of aromatic diamines and onium ions, ammonium ions, substituted ammonium ions and monovalent metallic ions and further containing a multivalent cation selected from the group consisting of alkaline earth metal, rare earth metal, transition metal and aluminium ions in an amount of 0.1 to 10 percent by weight of said monovalent cation said multivalent cation being present in an amount to improve the ionic conductivity of said crystalline complex.

2. An electrolyte according to claim 1, wherein said alkaline earth metal is selected from the group consisting of barium, calcium and magnesium.

3. An electrolyte according to claim 1, wherein said rare earth metal is selected from the group consisting of cerium and samarium.

4. An electrolyte according to claim 1, wherein said transition metaal is selected from the group conssiting of manganese, iron, nickel and cobalt.

5. An electrolyte according to claim 1 wherein said crystalline complex is ammonium TCNQ.

6. An electrolyte according to claim 1 wherein said crystalline complex is triethyl ammonium TCNQ.

7. The electrolyte according to claim 1 wherein the crystalline complex is potassium TCNQ.

8. The electrolyte according to claim 7 wherein the multivalent cation is magnesium.

References Cited

UNITED STATES PATENTS 3,483,438  12/1969  Sharbaugh _____ 252—62.2 X

OTHER REFERENCES

Melby et al. "J. Am. Chem. Soc.," vol. 84, pp. 3374–87, September 1962.

JAMES E. POER, Primary Examiner

J. COOPER, Assistant Examiner

U.S. Cl. X.R.

136—153; 317—230